(No Model.)
C. J. KILIAN.
WAGON AXLE.
No. 572,807. Patented Dec. 8, 1896.
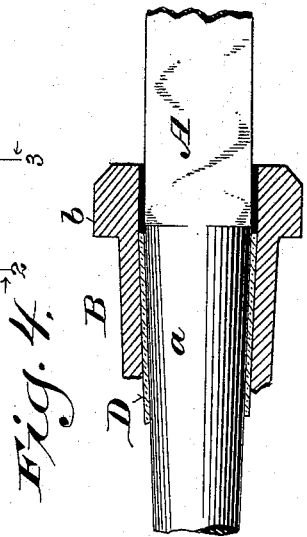
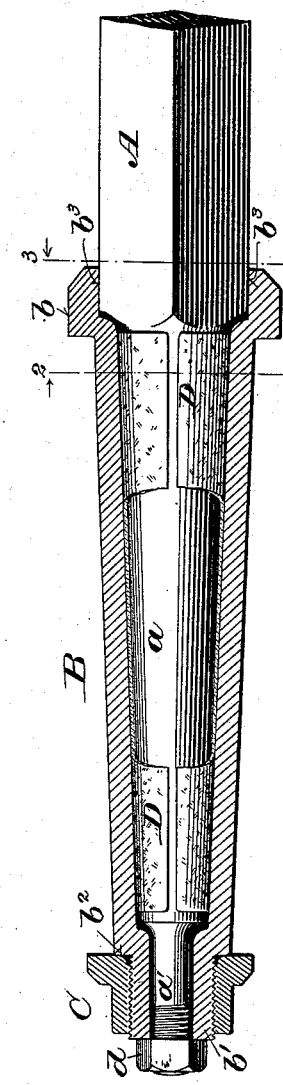
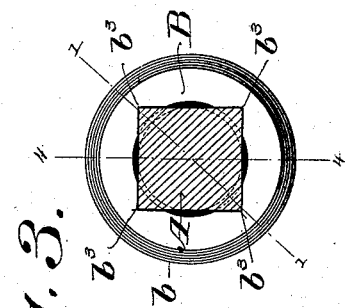
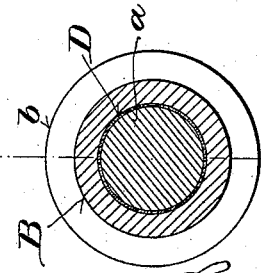
Witnesses:
Geo. W. Young,
Chas. L. Goss.
Inventor:
Conrad J. Kilian,

UNITED STATES PATENT OFFICE.

CONRAD J. KILIAN, OF MILWAUKEE, WISCONSIN, ASSIGNOR TO THE UNITED STATES AXLE AND SKEIN COMPANY, OF SAME PLACE.

WAGON-AXLE.

SPECIFICATION forming part of Letters Patent No. 572,807, dated December 8, 1896.

Application filed July 19, 1895. Serial No. 556,494. (No model.)

*To all whom it may concern:*

Be it known that I, CONRAD J. KILIAN, of Milwaukee, in the county of Milwaukee and State of Wisconsin, have invented certain new and useful Improvements in Wagon-Axles; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to simplify and improve the construction and operation of wagon-axles of this class.

It consists of certain novel features in the construction and arrangement of component parts of the axle, as hereinafter particularly described, and pointed out in the claims.

In the accompanying drawings like letters designate the same parts in the several figures.

Figure 1 is a partial side elevation and longitudinal section on the line 1 1, Figs. 2 and 3, of an axle embodying my invention. Fig. 2 is a cross-section on the line 2 2; Fig. 3, a similar section on the line 3 3, Fig. 1; and Fig. 4 is a longitudinal section of a portion of the axle on the line 4 4, Fig. 3.

A designates the body of the axle, which is made of square iron or steel and formed at each end with a tapering or conical spindle $a$, which has a reduced and threaded extremity $a'$. These conical spindles and their reduced extremities may be conveniently formed by swaging-dies, after which the threads are cut on the reduced extremities.

B designates a skein or sleeve, preferably made of cast-iron, tapering to correspond with the taper of the spindle $a$, but with a bore somewhat larger than said spindle. It is formed at its larger end with a collar $b$ and at its smaller end with a reduced externally-threaded portion $b'$, producing a shoulder $b^2$ for the abutment of the nut C, by which an axle-box and wheel are held on said sleeve. The recess in the larger end of the sleeve or skein B is formed with squared seats $b^3$ $b^3$ to fit the corners of the squared portion of axle A, as shown in Figs. 1 and 3. Between these seats the said recess or opening forms a continuation of the taper-bore through the sleeve, and said seats correspond with the corners of a square circumscribing the largest circumference of the axle-spindle, but are wholly outside of the largest circumference of said bore, so as to permit the easy withdrawal of the core upon which the sleeve is cast.

D designates a bushing, of paper or other analogous tough fibrous material, which is wrapped around or otherwise placed upon the spindle $a$, and the sleeve or skein B is forced into place over it. A tight fit is thus secured and rattling and wear are avoided without machine or hand fitting. The skein is secured and held in place on the spindle of the axle by a nut $d$, which is made smaller than the bore of the nut C, so as to permit the removal of the latter and of the wheel from the skein B without disturbing said nut $d$.

The hole in the skein B may be cast with sufficient accuracy and requires no extra fitting, the paper bushing D serving to produce the desired fit and to take up all play between the skein and spindle of the axle, as well as to cushion the skein and prevent or deaden jar and noise.

The paper of which the bushing is made may be moistened when it is applied, or treated with suitable material, such as oil or white lead, to make it conform more readily to any irregularities in the space which it is intended to fill and to render it harder and more durable. Whenever a skein is broken or defective or becomes worn, it can be easily removed and replaced.

With an iron or steel axle-body, which is much less cumbersome than a wooden axle, the skein B furnishes a bearing for the axle-box of large diameter without necessarily increasing the size of the body of the axle. It is of advantage also in that it affords a greater bearing-surface for the wheel to turn upon, and this, for reasons familiar to wheelwrights, causes the vehicle to run easier with less friction and wear on its axle-bearings.

To allow for the conformation of the paper bushing D to the axle, it may be cut so as to not quite reach around the spindle $a$, as shown in Fig. 1.

I claim—

1. In a wagon-axle the combination with a metallic body having a tapering spindle and a squared portion next to said spindle, of a sleeve or skein having a tapering bore corresponding with but a little larger than said spindle, and a squared recess or seat in the larger end of said bore, adapted to engage the corners of the squared portion of the axle-body, and a bushing of pliable material such as paper adapted to fill the space between the skein and spindle and to produce a tight fit between them, substantially as and for the purposes set forth.

2. The combination of a square metallic axle-body having a conical spindle equal in diameter at its larger end to a side of the square body, of a metallic sleeve or skein having a tapering hole corresponding in shape with but a little larger than said spindle, and seats or squared recesses in the larger end of said hole fitted to engage with the corners of the axle-body, and to prevent the skein from turning thereon, and corresponding with the corners of a square circumscribing the greatest circumference of said spindle, but being wholly outside of the greatest circumference of the hole in said skein, and a bushing of paper or analogous material which is rendered pliable and durable by treatment with suitable material such as oil or white lead, adapted to fill the space between said skein and spindle and thus produce a tight fit and prevent rattling and wear, substantially as and for the purposes set forth.

In testimony that I claim the foregoing as my own I affix my signature in presence of two witnesses.

CONRAD J. KILIAN.

Witnesses:
   CHAS. L. GOSS,
   A. W. HARD.